Oct. 26, 1926.  
J. B. FOOTE  
TRACTOR  
Original Filed Oct. 4, 1919   2 Sheets-Sheet 1
1,604,404
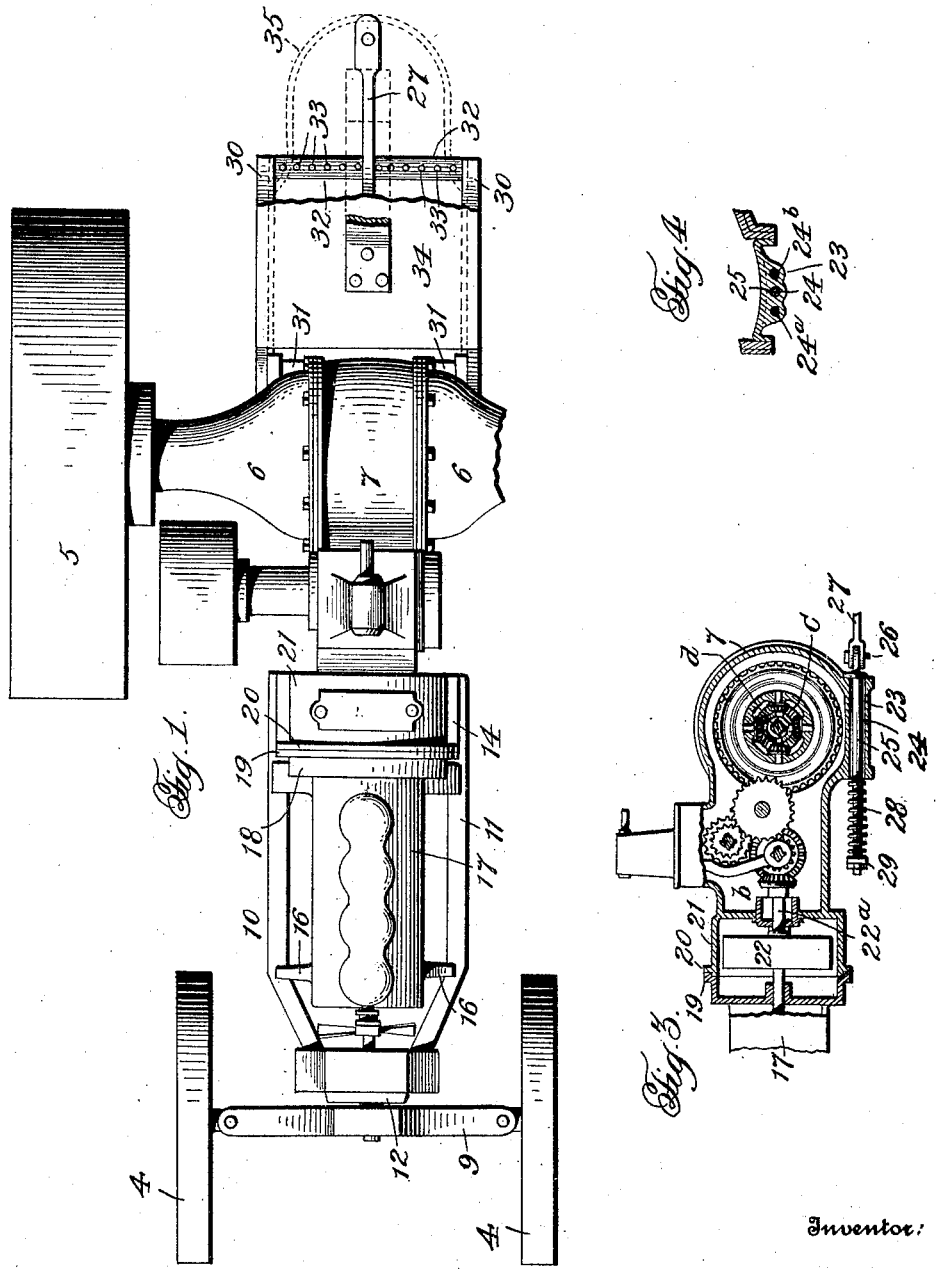

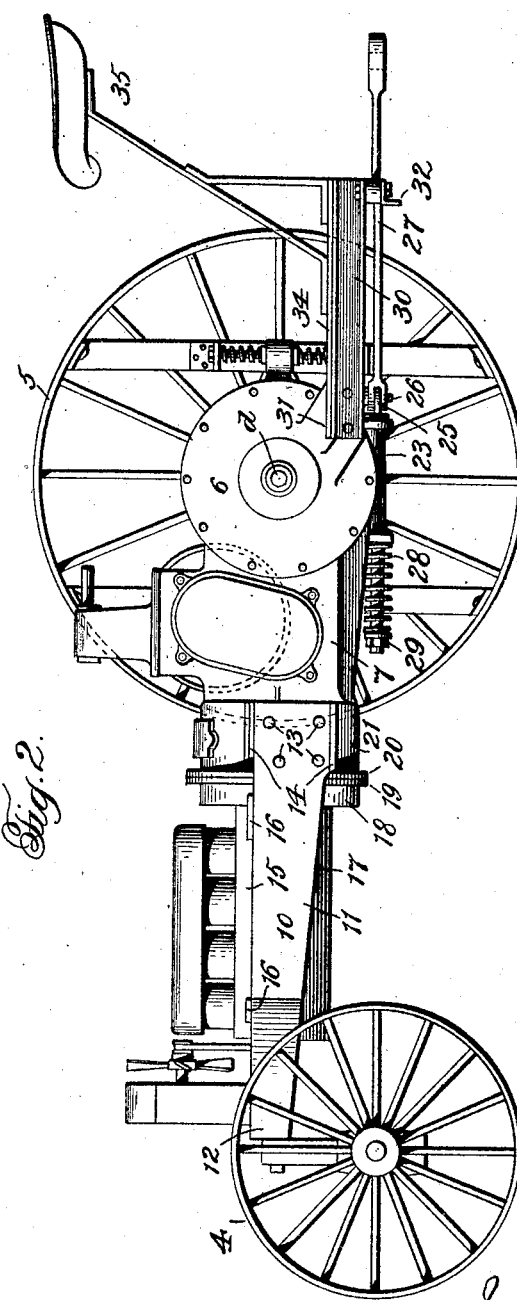

Patented Oct. 26, 1926.

1,604,404

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

TRACTOR.

Original application filed October 4, 1919, Serial No. 328,577. Divided and this application filed April 8, 1921. Serial No. 459,800.

The invention relates to tractors and its object is to provide an improved draft-connection whereby the draft-stresses will be directly applied to the gear-case around the differential gearing. This application contains matter which is a division of my application filed Oct. 4, 1919, Serial No. 328,577.

The invention consists in the novel features hereinafter set forth and more particularly defined by claims at the conclusion hereof.

In the drawings:

Fig. 1 is a plan, parts being broken away. Fig. 2 is a side elevation. Fig. 3 is a longitudinal section through the gear casing. Fig. 4 is a cross-section through the draft-lug.

The tractor comprises a pair of rear traction-wheels 5 supported on and driven by axles $d$ which are mounted in sleeves 6 which are secured to the sides of, and form extensions on, the rear portion of the gear-casing 7, and front-wheels 4 dirigibly connected to the front of the tractor. The front-portion of the case 7 contains variable speed transmission gearing $b$ and the rear portion encloses the differential gearing $c$. Said gearings may be of the type exemplified in my application for patent filed October 4, 1919, Serial No. 328,487 to which reference may be had for a detail description thereof. The case is adapted to serve as a part of the supporting structure between the front and rear portion of the tractor and together with a U-shaped frame 10 constitutes the general supporting structure, as more fully set forth in my aforesaid application 328,577. A motor 15 is secured on the frame 10 and drives the transmission gearing $b$ which in turn drives the differential to drive the wheel-axles $d$.

A lug 23 is integrally formed on the underside of the rear portion of the case 7 and this lug has a longitudinal hole 24 therein. A draft-rod 25 extends through and is slidable in the opening 24 and its rear end is pivoted, as at 26, to a laterally swinging draft-bar 27, the rear end of which is adapted to be connected to a plow or other implement to be operated by the tractor. A cushion-spring 28 is interposed between the front end of the lug 24 and a nut 29 adjacent the front end of the rod 25. Additional openings 24$^a$ and 24$^b$ are provided on the sides of opening 24 so that when the tractor is used for side-hill work where it is frequently necessary to apply the draft rod laterally of the longitudinal center of the tractor, the draft rod may be inserted through either of the holes 24$^a$ and 24$^b$ according to the side at which the draft is desired. The draft stresses are applied to the front of the lug and the spring is disposed forwardly of the lug where there is usually available sufficient space for as long a spring as may be desired, for effective cushioning. A characteristic of this construction is that the the draft is applied by the draw-bar directly to a lug on the gear-case which forms a part of the general supporting structure.

Channel-bars 30 are secured to lugs 31 integral with the axle-sleeves 6 and are connected at the rear by an angle-bar 32 which is provided with holes 33 adapted to receive side-stops for the draw-bar 27. These bars are adapted to support a platform 34 on which the seat 35 is mounted.

The invention is not to be understood as restricted to the details set forth, since these may be modified within the scope of the appended claims, without departing from the spirit and scope of the invention.

What is claimed is:

1. In a tractor, the combination of front and rear carrying-wheels, a gear-case, a rear axle in one end of the case, differential gearing in the rear of said case, lugs on the rear portion of the case and platform-supporting bars secured to and extending rearwardly from said lugs.

2. In a tractor, the combination of front and rear carrying-wheels, a gear-case, a rear axle in one end of the case, differential gearing in the rear of said case, a draft-lug on the case, lugs integral with the rear portion of the case, and platform-supporting bars secured to and extending rearwardly from said latter lugs.

In testimony whereof I affix my signature.

JOHN B. FOOTE.